US008327002B1

(12) United States Patent
Van Dussen et al.

(10) Patent No.: US 8,327,002 B1
(45) Date of Patent: Dec. 4, 2012

(54) BGP PEER PRIORITIZATION IN NETWORKS

(75) Inventors: Brent Van Dussen, San Diego, CA (US);
Denver Maddux, Seattle, WA (US);
Tom Coffeen, San Francisco, CA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/563,099

(22) Filed: Jul. 31, 2012

(51) Int. Cl.
*G06F 15/16* (2006.01)
*H04L 12/28* (2006.01)
*G06F 15/173* (2006.01)
*H04M 3/00* (2006.01)

(52) U.S. Cl. ........ 709/228; 709/240; 709/249; 370/242; 370/254; 455/418

(58) Field of Classification Search ........................ None
See application file for complete search history.

(56) References Cited

U.S. PATENT DOCUMENTS

| | | | | |
|---|---|---|---|---|
| 5,206,856 | A * | 4/1993 | Chung | 370/400 |
| 6,134,589 | A | 10/2000 | Hultgren | |
| 7,242,928 | B2 * | 7/2007 | Choi | 455/418 |
| 7,333,438 | B1 * | 2/2008 | Rabie et al. | 370/242 |
| 7,561,526 | B2 | 7/2009 | Naden et al. | |
| 8,014,404 | B2 | 9/2011 | Eki et al. | |
| 8,238,266 | B2 * | 8/2012 | Hamada | 370/254 |
| 2008/0235400 | A1 | 9/2008 | Slocombe et al. | |
| 2012/0147753 | A1 * | 6/2012 | Jayawardena et al. | 370/238 |

OTHER PUBLICATIONS

Cisco, "Configuring Advanced BGP—Cisco", Retrieved on Aug. 17, 2012 from http://www.cisco.com/en/US/docs/switches/datacenter/sw/5_x/nx-os/unicast/configuration/guide/13_advbgp.pdf, Jul. 20, 2011, p. 1-46.
Danny Dolev, "Internet Resiliency to Attacks and Failures Under BGP Policy Routing", Retrieved on Aug. 17, 2012 from http://www.cse.psu.edu/~bhuvan/teaching/fall05/papers/bgp-res.pdf, Nov. 14, 2006, p. 1-12.

* cited by examiner

*Primary Examiner* — Wen-Tai Lin
(74) *Attorney, Agent, or Firm* — Kilpatrick Townsend & Stockton, LLP (57) ABSTRACT

A method for establishing routes to neighboring networks during an initialization sequence according to a prioritized order may include detecting a power-cycling event and accessing a plurality of identifiers stored in a memory device that persisted through the power-cycling event. Each of the plurality of identifiers may be associated with a network. The networks may include first networks that are coupled to network endpoints, and second networks that are capable of coupling to the one or more first networks. For each network, the method may further include accessing a priority field in the memory device that may be associated with the network. The respective priority field can be based on an order in which communications should be established with the network and application layer information. The method may also include attempting to establish communications with each of the plurality of networks in an order based on the priority fields.

19 Claims, 9 Drawing Sheets

BGP PEER PRIORITIZATION IN NETWORKS

BACKGROUND

This disclosure relates in general to establishing network relationships and, more specifically, but not by way of limitation, to prioritizing relationships after a power-cycling event.

The Internet is an amalgamation of various networks that pass each other's network traffic such that recipients can receive information. The various networks can be divided into full-route and terminal networks. Full-route networks are connected such that any point on the Internet can be reached by the full-route network by using terminal networks and other full-route networks. Recipients generally have Internet service from a terminal network and may use a combination of full-route and terminal networks to communicate with all other locations on the Internet.

Many types of devices are used to communicate with both full-route and terminal networks on the Internet. Generally, these devices are used to identify neighboring networks and generate an Internet routing table to direct traffic through other devices to any point on the Internet. The Border Gateway Protocol (BGP) is the protocol backing the core routing decisions on the Internet. BGP-compliant devices can maintain a table of IP networks, or "prefixes," which designate network reachability among autonomous systems (AS). BGP is a path vector protocol and, thus, makes routing decisions based on path, network policies, and/or rule-sets.

SUMMARY

In one embodiment, the present disclosure provides a method for establishing routes to neighboring networks during an initialization sequence according to a prioritized order. The method may include detecting a power-cycling event, and accessing a plurality of identifiers stored in a memory device that persisted through the power-cycling event. In one embodiment, each of the plurality of identifiers may be associated with one of a plurality of networks. The plurality of networks may include one or more first networks that are coupled to network endpoints, and one or more second networks that are capable of coupling to the one or more first networks. The method may also include, for each network in the plurality of networks, accessing a respective priority field in the memory device. In one embodiment, the respective priority field may be associated with the network. The respective priority field may be based on an order in which communications should be established with the network, and application layer information. The method may additionally include causing a processing function to attempt to establish communications with each of the plurality of networks, wherein the attempts to establish communications may be ordered based on the respective priority field associated with each of the plurality of networks.

In another embodiment, a device for determining routing pathways for transmitting information over a network is presented. The device may include a network interface coupled to a plurality of networks including one or more first networks that are coupled to network endpoints, and one or more second networks that are capable of coupling to the one or more first networks. The device may also include a power module that participates in a power-cycling event and a persistent memory device. The persistent memory device may store a plurality of identifier fields, where each of the plurality of identifier fields may be associated with one of a plurality of networks; and a plurality of priority fields, where each of the plurality of priority fields may be associated with at least one of the plurality of networks. In one embodiment, each of the plurality of priority fields may be based on an order in which communications should be established with the respective network, and application layer information. The device may further include a processing function that receives an indication from the power module of the power-cycling event has occurred and attempts to establish communications with each of the plurality of networks. In one embodiment, the attempts to establish communications may be ordered based on the respective priority field associated with each of the plurality of networks.

In yet another embodiment, a method for prioritizing establishing routes to neighboring networks using persistent and non-persistent memory devices is presented. The method may include storing information identifying routes through a plurality of networks in a first memory device, and storing a plurality of identifier fields in a second memory. In one embodiment, the each of identifier fields may be associated with one of the plurality of networks. The method may also include storing a plurality of priority fields in the second memory, where each of the priority fields may be associated with one of the plurality of networks. The method may additionally include reducing a power level provided to the first memory device such that the information identifying routes is no longer accessible in the first memory device. The method may further include reducing a power level provided to the second memory device, where the plurality of identifier fields and the plurality of priority fields may remain accessible in the second memory device. The method may also include restoring power to both the first memory device and the second memory device. The method may additionally include causing a processing function to attempt to establish communications with each of the plurality of networks, wherein the attempts to establish communications may be ordered based on the respective priority field associated with each of the plurality of networks.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the invention. Rather, the ensuing description of the preferred exemplary embodiment(s) will provide those skilled in the art with an enabling description for implementing a preferred exemplary embodiment of the invention. Various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" or "memory device" may represent one or more devices for storing data, including read only memory (ROM), random access memory (RAM), magnetic RAM, core memory, magnetic disk storage mediums, optical storage mediums, flash memory devices, and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one sense, the Internet may be described as a vast number of interconnected computer systems. Most of these connections are managed using routers. In order to maintain these connections, most Internet routers operate using BGP. Embodiments described herein can be compatible with BGP, and when a router is initially activated with the network, it loads a list of neighboring networks to which the router has a physical connection. The router begins broadcasting its route information to the neighboring networks, which in turn broadcast their route information to the router. The router begins building an internal table of networks and IP addresses that are reachable through the neighboring networks. This way, the router can connect with networks and addresses that are not considered neighboring networks but are available through the neighboring networks.

According to the standard definition for BGP: "the primary function of a BGP speaking system is to exchange the network reachability information with other BGP systems" and with this information "to construct a graph of autonomous system connectivity from which routing loops may be pruned and some policy decisions at the autonomous system level may be enforced." Although many algorithms exist for determining optimal routes through the Internet, and for optimizing the Internet routing table that is built within the router, this can still be a very lengthy process. BGP provides a protocol by which route information can be exchanged, but it does not provide solutions for optimal route management.

One particular problem faced by network operators and Internet professionals manifests itself when a router undergoes a power-cycling event. When a router loses power, it loses its table of Internet routes that was calculated based on the route advertisements provided by neighboring networks. When power is restored, the router begins rebuilding its route table by advertising its connections to neighboring networks. The process of building a roundtable is known as "reconvergence". Currently, it can take up to 30 minutes for a full reinitialization of an Internet routing table. This time will tend to increase in the future as additional routes, autonomous systems, and endpoints are added to the Internet.

Presented herein are methods and systems for increasing the speed at which full Internet connectivity can be restored in an ISP when power is restored to a router. At present, routers begin reinitializing their Internet routing table by randomly sending route advertisements to neighboring networks. These communications are typically asynchronous and can take minutes to complete. Embodiments discussed herein prioritize the order in which communications are attempted to be established with neighboring networks. Critical networks that establish full-route connectivity, that increase revenue, or that maximize traffic, can be contacted first. Thus, processing power and communication interfaces can be dedicated to high-priority networks such that communications can be established quickly. Communications can be attempted to be established with the remaining networks after traffic is flowing through the high-priority networks.

Figure 1:
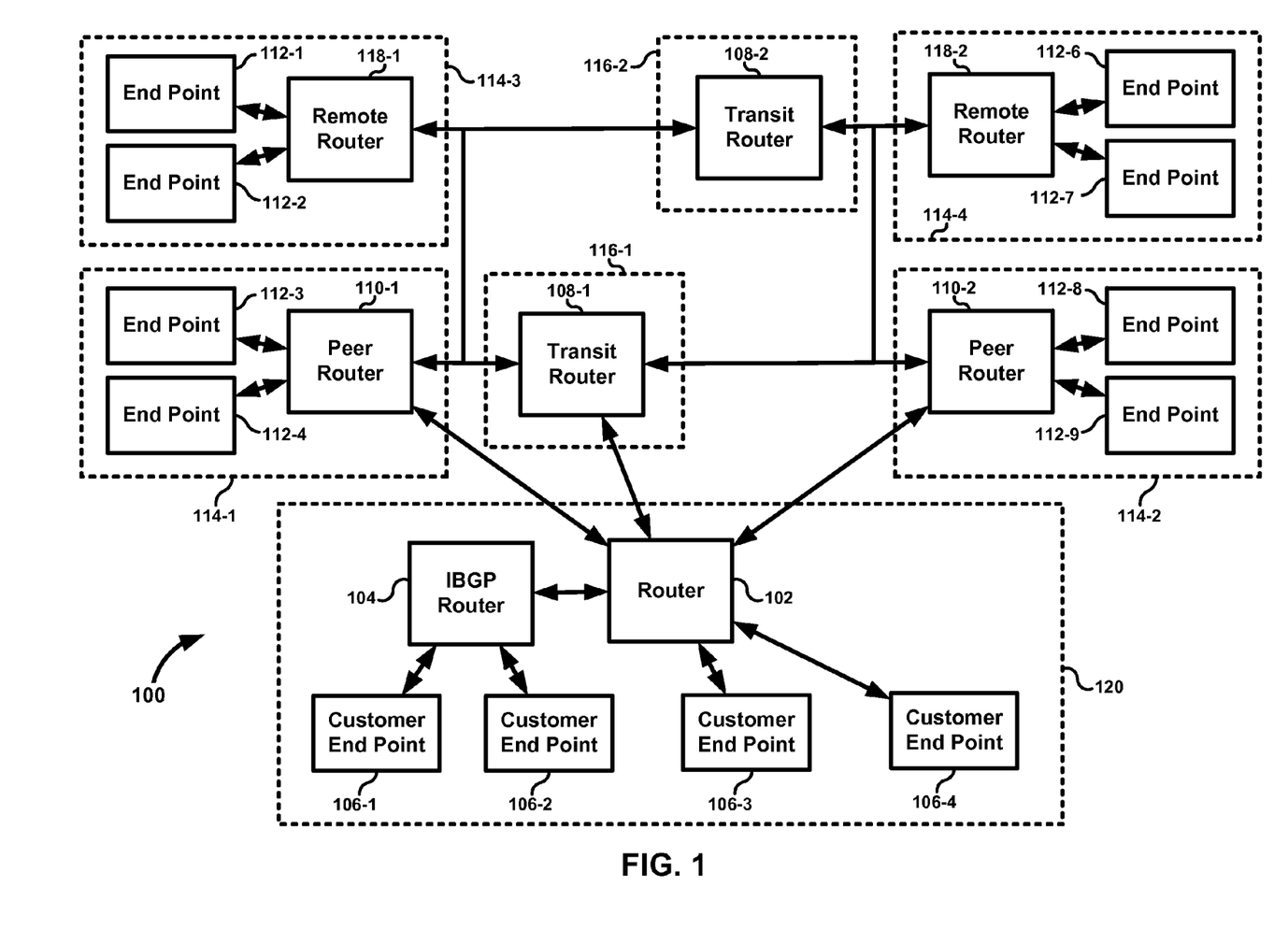
FIG. 1 is a block diagram of an embodiment of a plurality of networks.

With reference to FIG. 1, a block diagram of an embodiment of a plurality of networks is shown. The block diagram in FIG. 1 represents a system in which the methods and systems presented herein may be implemented. This embodiment shows the complex relationships between various networks 114, 116, 120 that make up the Internet 100. Note that this embodiment is merely exemplary. Many other configurations are possible, and this embodiment is simplified in that the main connections and networks available on the Internet 100 are not illustrated for clarity. Each independent network on the Internet 100 may be referred to as an Autonomous System (AS). An AS is a collection of connected IP routing prefixes under the control of one or more network operators that presents a common and clearly defined routing policy to the Internet 100. Both full-route networks and terminal networks are commonly considered to be Autonomous Systems.

Recipient customer endpoints 106 get their Internet access through an Internet service provider (ISP) 120. An ISP 120 is an organization that provides access to the Internet 100. An ISP 120 can be either community-owned and non-profit or privately owned and for-profit. An ISP 120 may commonly be called a "terminal network." An ISP can also be referred to as an Autonomous System.

An ISP 120 is typically comprised of multiple customer endpoints 106 that are connected to a router 102. Most ISPs are large enough that more than one router is required to service all of the customer endpoints 106. Additional routers within the ISP network communicate using a special subset of BGP, known as the internal Border Gateway Protocol, or internal BGP (iBGP). Internal BGP is the protocol used between routers within the same autonomous system. In other words, iBGP is used to provide information to internal routers such that an autonomous system (or ISP 120 in this embodiment) can share routing information internally. Router 120 can be an edge router or provider edge router that is placed at the edge of the ISP 120 to communicate with external BGP routers in other networks.

Consequently, the ISP 120 can include additional internal routers, referred to herein as iBGP routers, or internal routers. For clarity, ISP 120 only depicts two internal routers, namely router 102 and iBGP router 104. However, ISP 120 will be understood to include many additional internal routers that are not shown for clarity. Each internal router can be connected to one or more of the other internal routers. In one embodiment, each internal router is connected to all of the other internal routers in a mesh network. Each internal router may also be connected to one or more customer endpoints 106. For example, iBGP router 104 is coupled to customer endpoints 106-1, 106-2, while router 102 is coupled to customer endpoints 106-3, 106-4.

Router 102 is shown to have connections to additional networks 114, 116. This configuration may be used where router 102 acts as a gateway for the rest of the ISP 120 to connect to the Internet 100. All ingress and egress traffic will be routed through router 102. However, in another embodiment, each internal router in the ISP 120 can be configured to connect with any external networks, including networks 114, 116. The remaining discussion of FIG. 1 will focus on connections made by router 102. It will be understood that the description presented herein can apply equally to any other internal router in the ISP 120.

In order to connect to external networks 114, 116, router 102 can be configured to communicate with routers with in the external networks 114, 116. The Internet 100 is largely a group of networks that agree to carry each other's traffic for free (e.g., a peer relationship) or for a fee. In this embodiment, the ISP 120 communicates with the Internet 100 that is made up of external networks 114, 116. Generally, the external networks 114, 116 may be comprised of at least two types. Terminal networks 114 can be defined as networks that connect to endpoints 112 throughout the Internet 100. Terminal networks 114 are generally autonomous systems and may be implemented with an ISP. Endpoints 112 may be comprised of user computers, servers, mobile computing devices, or the like. Most users of the Internet 100 connect using a device that may be considered an endpoint 112.

Full-route networks 116 can be defined as networks that connect to all of the terminal networks 114. In this embodiment, each full-route network 116 can route traffic through each of the other full-route networks 116. For example, full-route network 116-1 is shown to be communicatively coupled to full-route network 116-2. However, in other embodiments, this is not required. One example of a full-route network 116 is a network known as a Tier 1 network. Tier 1 networks are networks that typically charge to receive or send content from content distributors, terminal networks 114, and/or content originators. Tier 1 networks are full-route networks, and any IP address is reachable from any Tier 1 network.

Generally terminal networks 114 can use the full-route ability of the Tier 1 networks to provide full-route service to all of the endpoints 112. For example, ISP 120 can utilize full-route network 116-1 to reach any IP address on the Internet 100, and thus provide full-route service to all of the customer endpoints 106 who subscribe with the ISP 120 for Internet service. Therefore, ISP 120 can communicate with terminal networks 114-3, 114-4 and, consequently, with endpoints 112-1, 112-2, 112-6, 112-7, even though router 102 is not directly coupled to remote routers 118-1, 118-2. In addition to terminal networks and full-route networks, other types of networks may also be connected to router 102. For example, some full-route networks could also connect directly to various end points.

Interconnects between the various networks 114, 116, 120 could be implemented with packet switched or circuit switched connections that are generally bandwidth controlled or limited. For example, the router 102 could have a 10 MB/minute connection to full-route network 116-1. Over-utilized interconnects generally suffer from poor quality-of-service, which can include slow speeds and/or lost packets.

In addition to using full-route networks 116 to transmit information to the terminal networks 114, the ISP 120 can also be configured to connect directly to some of the terminal networks 114. For example, some of the terminal networks 114 may be local networks that operate within a geographic proximity of the ISP 120. In this embodiment, the ISP 120 is directly communicatively coupled to terminal networks 114-1, 114-2. Terminal networks 114-1, 114-2 may be referred to as peer networks, and routers within terminal networks 114-1, 114-2 may be referred to as peer routers 110. Thus, router 102 may be configured to connect to both full-route networks as well as neighboring terminal networks.

Once the Internet routing table is established, router 102 will be connected to its neighboring peer networks 110, as well as full-route networks 116. At this point, an operator of the ISP 120 can utilize policies that maximize the number of inter-AS peers and optimized Internet routes for economic and performance benefits. However, these policies are typically not put into effect until the routing table is converged. BGP systems presume the quality of peers during convergence and prior to establishing any sessions. The goal of existing systems is the rapid establishment of all routes to provide a graph of AS connectivity. Notably absent from existing systems is the ability to prioritize the establishment of sessions based on the relative value of each peer. Neither is there any method to deal with the inevitable time variance of peer establishment and prefix exchange due to resource constraints that are inherent in the router upon which the peers are configured. In contrast, some embodiments presented herein prioritize the order in which these initial communications are established.

Figure 2:
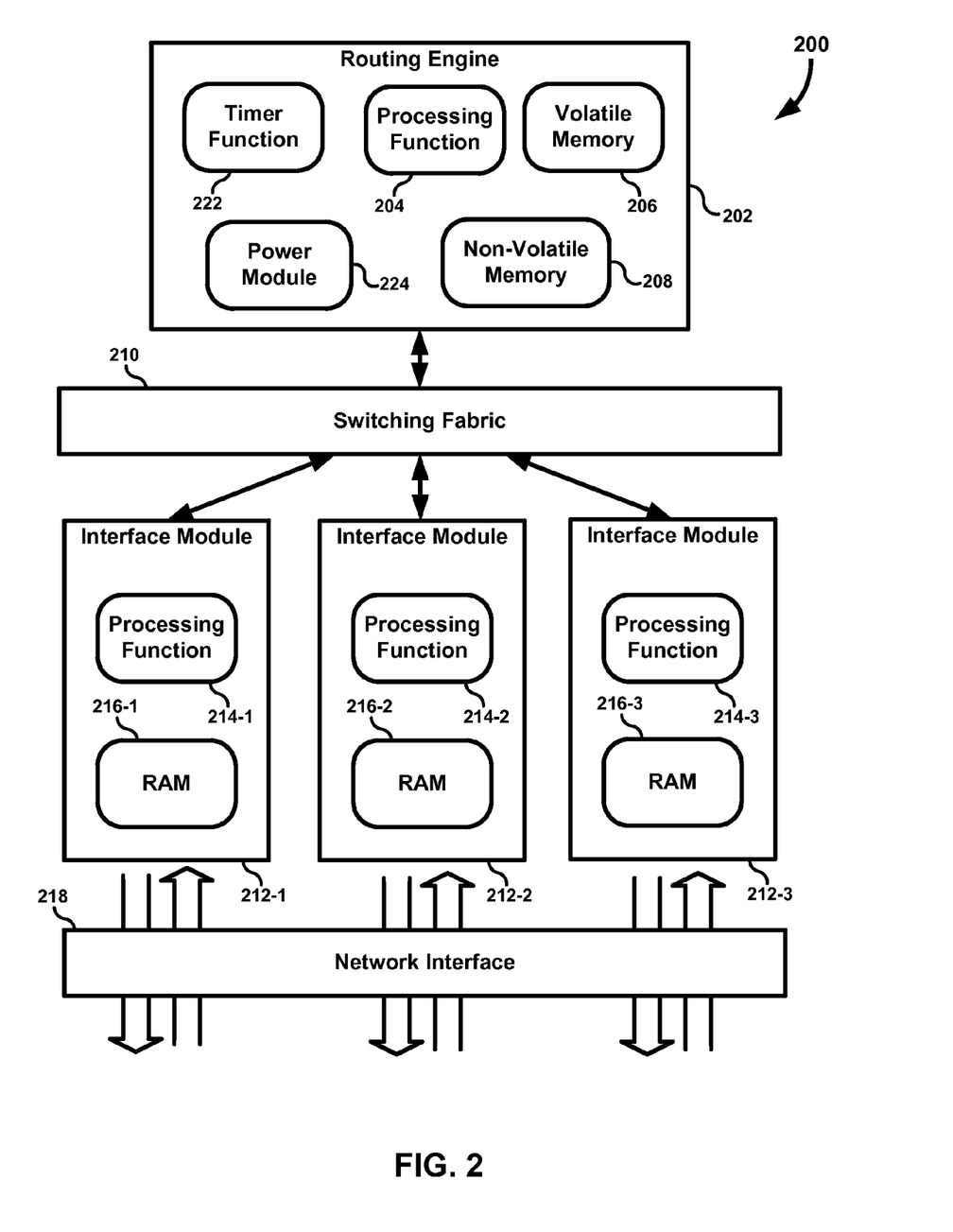
FIG. 2 is a block diagram of an embodiment of a network connection device.

Referring next to FIG. 2, a block diagram of an embodiment of network connection device 200 is shown. The network connection device 200 includes a network interface 218 that can be coupled to a plurality of networks. In one embodiment, the network interface 218 may include connections to each individual neighboring network. The network interface can utilize one or more interface modules 212 to handle the individual connections. Each interface module 212 can include a processing function 214 and a memory device 216, along with other components. Although FIG. 2 only illustrates three interface modules 212-1, 212-2, 212-3, these are merely exemplary. Real implementations of the network connection device 200 will commonly include a larger number of interface modules 212 to deal with numerous neighboring network connections through the network interface 218.

The network interface 218 and the interface modules 212 may each be dedicated to a single network. Alternatively, a single interface module, such as interface module 212-1 may be configured to handle multiple neighboring network connections. In one embodiment, the network interface 218 includes a dedicated physical port for each neighboring network connection.

As used herein, the term "processing function" can include any hardware device, or portion of a hardware device, configured to perform logical functions. In various embodiments, a processing function comprises a microprocessor, multiple microprocessors, distributed microprocessors, microcontrollers, FPGAs, lookup tables, digital logic circuits, analog circuits, operational amplifiers, asynchronous logic, and/or the like. Note that the processing function need not be a dedicated processing function. In some embodiments, the processing function may include a general purpose microprocessor configured to execute instructions to carry out the desired functionality. Furthermore, the listing above of hardware devices is merely exemplary and not meant to be limiting.

The network connection device 200 can also include switching fabric 210 configured to connect neighboring networks to each other via one or more network switches, or crossbar switches, in order to spread Internet traffic across multiple physical links. The switching fabric 200 may function as a point-to-point interconnect and may scale to handle any number of interface modules 212 and/or neighboring networks.

The network connection device 200 can also include a control unit 202 configured to coordinate operations of the network connection device 200. The control unit 202 is also configured to control, monitor, and otherwise influence the connections made by the switching fabric 210. The control unit 202 includes a processing function 204, which can include any of the hardware devices described above. Note that in some embodiments, when a step is performed by a "processing function," this can collectively include all of the steps taken by processing function 224, as well as processing functions 214 on the interface modules 212.

The processing function 204 is coupled to at least one memory device, namely the nonvolatile memory 208. As used herein, the term "nonvolatile memory" comprises a memory device that is capable of reliably retaining data stored therein in the absence of active power. A nonvolatile memory may include a read-only memory, flash memory, ferroelectric RAM, hard disk, floppy disk, magnetic tape, optical disk, magnetoresistive RAM, holographic memory, NVRAM, mask ROM, PROM, EPROM, EEPROM, and/or the like. A nonvolatile memory may also be referred to as a persistent memory.

In some embodiments, the processing function 204 can also be coupled to an additional memory, namely the volatile memory 206. As used herein, the term "volatile memory" comprises a memory device that does not reliably retain data stored therein in the absence of active power. Volatile memory may include RAM, DRAM, SRAM, and/or the like.

The network connection device 200 can also include a power module 224 that converts AC power to low-voltage regulated DC power for the internal components of the network connection device 200. In one embodiment, the power module 224 comprises a switch-mode power supply. In another embodiment, the power module 224 receives DC power and regulates the DC power to various levels needed by the internal components of the network connection device 200.

The power module 224 can be involved in power-cycling events. A power-cycling event can include a loss of external power to the extent that the power module 224 can no longer supply sufficient power to the internal components of the network connection device 200 such that they can function normally. A power-cycling event can also include an intentional power down and power up of the network connection device 200, causing the network connection device 200 to reboot and the processing function 204 to execute one or more initialization routines. A power-cycling event can also include an initial power-up after installing the network connection device 200, or a power-up after a prolonged period without power. Following a power-cycling event, the contents of the volatile memory 206 may no longer be reliably stored therein. If the Internet routing table describing routes to all available networks was stored in the volatile memory 206, then a power-cycling event will typically require that the Internet routing table be rebuilt and reconverged. In contrast, the contents of the nonvolatile memory 208 will typically remain reliably stored therein following a power-cycling event. In one embodiment, a list of identifiers can be stored in the nonvolatile memory 208 such that they persist through the power-cycling event. Each identifier in the list of identifiers can be associated with one of the neighboring networks. Therefore, even if the Internet routing table is lost during a power-cycling event, the network connection device 200 can still use list identifier stored in the nonvolatile memory 208 to identify neighboring networks and rebuild the Internet routing table.

Furthermore, the power module 224 and/or the processing function 204 may be configured to detect a power-cycling event by detecting when supply voltages fall below a threshold value. Also, the processing function 204 may receive an indication from the power module 224 that a power-cycling event is about to occur, or has already occurred. For example, the power model 224 may include a communication line with the processing function 204 that may transmit a low-power detection signal. Alternatively, the voltage of the power supplied by the power module 224 may also act as a low-power detection signal. In other words, the processing function 204 may interpret a low-voltage power output from the power module as a signal indicating that a power-cycling event is about to occur. Similarly, during power-up, the power module 224 may send a dedicated power-up signal to the processing function 204. Alternatively, the power module 224 may simply begin providing power to the processing function 204 as a signal that a power-cycling event recently occurred.

In some embodiments, the network connection device 200 can also include a timer function 222. The timer function 222 may be integrated part of the processing function 204. For example, many microcontrollers and microprocessors include various timers and interrupts that may be used to implement the timer function 222. The timer function may be configured to regulate the communication signals that are sent by the processing functions 204, 212 during initialization and while rebuilding the Internet routing table. After the Internet routing table is converged, the timer function 212 may also be configured to perform any other functions related to the operation of the network connection device 200.

It should be noted that the network connection device 200 illustrated in FIG. 2 is merely exemplary and not meant to be limiting. Many alternative devices may be used to implement various methods and systems described herein. For example, many commercially available Internet routers may be configured and/or programmed to prioritize establishing communications with neighboring networks during initialization. Some of these commercially available systems include the Cisco 7600 or 12000 series, the Brocade XMR/MLX and the Juniper M or T series. Furthermore, the various pieces of hardware and software in the network connection device 200 illustrated in FIG. 2 can be rearranged, combined, split, and/or alternatively altered, as will be understood by one having skill in the art.

Figure 3:
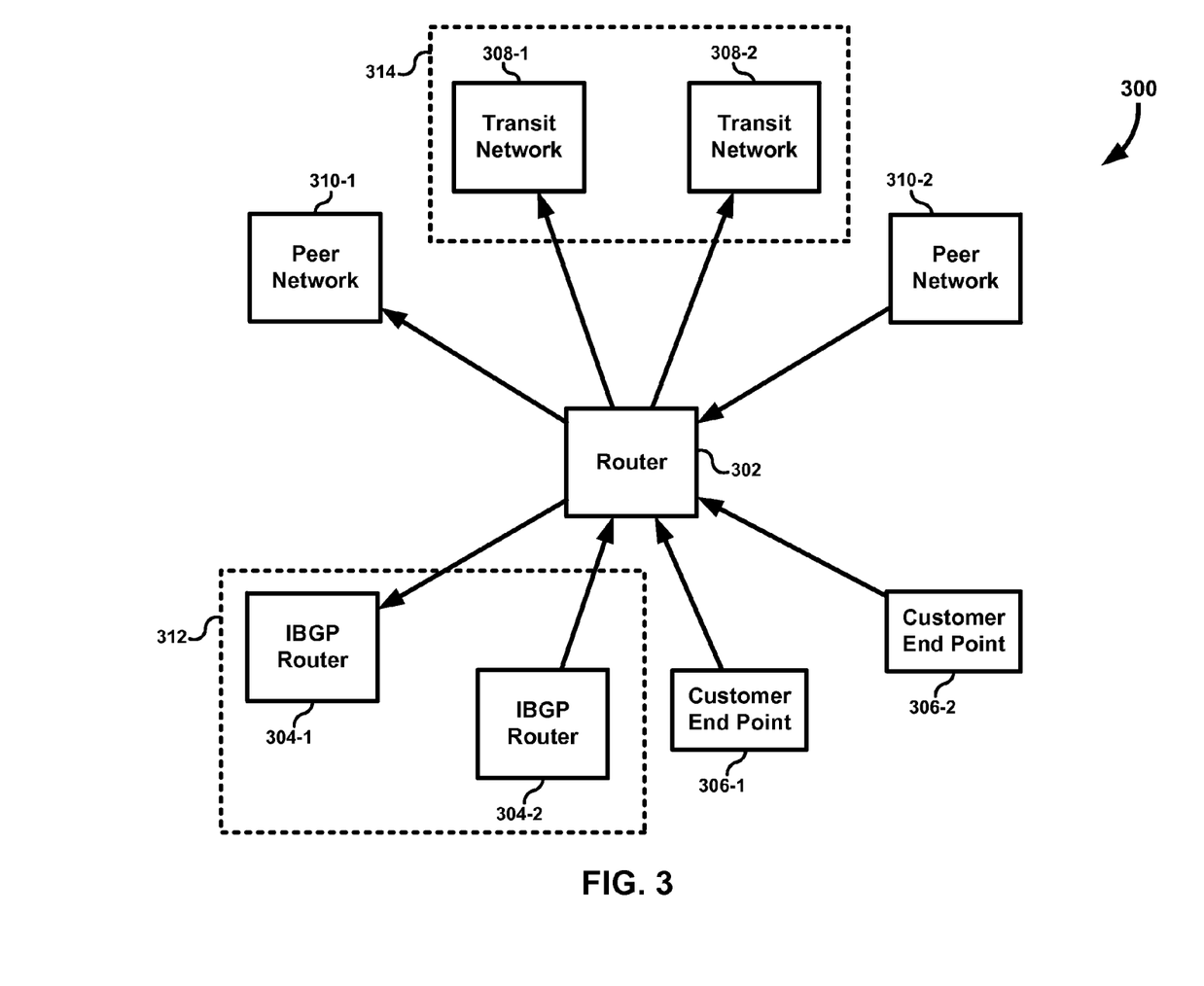
FIG. 3 is a block diagram of an embodiment of an optimal connection network after a power-cycling event.

Referring next to FIG. 3, a block diagram of an embodiment of an optimal connection network 300 after a power cycle is shown. The interconnection of networks is similar to that shown in FIG. 1. Router 302 is connected to a number of external networks, along with a number of internal devices. For example, router 302 is connected to a plurality of iBGP peer routers 304 that belong to the same autonomous system as the router 302. Additionally, the router 302 is connected to customer endpoints 306. The iBGP peer routers 304 and the customer endpoints 306 may be considered internal connections.

Router 302 is also connected to a number of external networks, including peer networks 310 and transit networks 308. The peer networks 310 can be considered terminal networks, whereas the transit networks 308 can be considered full-route networks. Normally, after a power-cycling event, each of the possible connections for router 302 would be viewed equally. In absence of the embodiments discussed herein, router 302 would begin rebuilding the Internet routing table by beginning to establish communications with each of the networks 304, 308, 310, without regard for priority. The embodiment discussed herein changes this operation such that connections are established in a prioritized order.

In the embodiment of FIG. 3, a first method of organizing the available networks 304, 308, 310 according to a priority is illustrated. In this embodiment, priority may be assigned in order to quickly establish full, connectivity with the Internet. Because router 302 has access to transit networks 308 that offer full-route connectivity to the Internet, transit networks 308 may receive the highest priority. Following a power-cycling event, router 302 can first attempt to establish communications with the transit networks 308 based on this priority. Once communications have been established and routes have been exchanged with the transit networks 308, the router 302 can then attempt to establish communications with the remaining neighboring networks.

In some embodiments, all the available networks can be assigned to one of two peer groups. A single bit may be used to represent a group's priority. A "1" can represent a first priority, and a "0" can represent a second priority. In other embodiments, more complex values may be used to represent priorities. In a particular embodiment, priorities may be numbered with integer values with "1" being the highest priority, "2" being the second highest priority, and so forth. A "0" value may indicate a default value representing the lowest priority. Therefore, the highest priority networks can be assigned a "1" priority, the second highest priority networks can be assigned a "2" priority, and the remaining networks can be associated with the default "0" priority.

In the embodiment of FIG. 3, where priorities are established based on quickly restoring full connectivity to the Internet for customers of an ISP, the iBGP peer routers 304 can be assigned the second highest priority. Therefore, after an attempt has been made to establish communications with the transit networks 308, an attempt may be made to establish communications with the iBGP peer networks 304. In other words, in this embodiment priority may be established by first connecting with the transit networks 308, then connecting to the iBGP routers 304, then connecting with the customer endpoints 306, and finally connecting with the external peer networks 310. Note that after connecting with the transit networks 308, router 302 will have indirect access to the external peer networks 310 through the transit networks 308. Although this may not be an optimal route, it may represent a route that is available earlier in the initialization sequence than would be available without prioritization.

In one embodiment, the transit networks 308 are assigned a common priority, such as a priority of "1". Neighboring networks can be organized into groups of similar networks and may be referred to as "peer groups." Each peer group, such as transit group 314, is assigned a common priority. The router 302 attempts to establish communications with one or more networks within each peer group according to the groups' priorities. In one embodiment, the router 302 attempts to establish communications with every network within one peer group before moving on to another peer group. For example, router 302 can begin with transit group 314. Before attempting to establish communications with any network not belonging to transit group 314, router 302 would first attempt to establish communications with transit network 308-1 and transit network 308-2.

In another embodiment, each network within a peer group can be further prioritized, such that the router 302 attempts to establish communications with each network within a peer group in a particular order. Thus, a peer group can be assigned a priority, and each network within a peer group can be assigned another priority. For example, if transit group 314 has the highest priority, transit network 308-1 can be assigned the highest priority within transit group 314, while transit network 308-2 can be assigned a lower priority. In embodiments where priorities are established to ensure full-route connectivity to the Internet, one transit network may be preferred over the other according to which transit network connects to the most terminal networks, which transit network costs the ISP the least amount of money, or which transit network responds the quickest to attempts to establish communications. Similarly, iBGP routers 304 may be prioritized according to which connects to the most customer endpoints, or which customer endpoints pay for a higher level of service.

In another embodiment, router 302 attempts to establish communications with a single network within each peer group before moving on to the next. After an attempt is made to establish communications with at least one network in each peer group, router 302 may then attempt to establish communications with a second network in each peer group. For example, router 302 could first attempt to establish communications with transit network 308-1. Router 302 could then attempt to establish communications with iBGP router 304-1. If peer groups 312, 314 are the only peer groups, then router 302 could attempt to establish communications with transit network 308-2 and then iBGP router 304-2. Having exhausted all members of the existing peer groups 312, 314, router 302 could then connect with the remaining customer endpoints 306 and any remaining peer networks 310.

In another embodiment, router 302 could attempt to establish communications with each network within a peer group until communications have actually been established with at least one network within the peer group. The process of exchanging routes with a single network may be comprised of a number of asynchronous communications, which are not guaranteed to succeed. For example, router 302 could send a request to transit network 308-1. However, transit network 308-1 may not be available and, thus, may not respond to the request. In this case, router 302 could then send request to establish communications with transit network 308-2. If transit network 308-2 responded and information is exchanged between router 302 and transit network 308-2, then router 302 could move on to iBGP peer group 312 and attempt to establish communications with each network within iBGP peer group 312 until at least one attempt was successful. This would ensure a connection with at least one full-route network within transit peer group 314 before attempts are made to establish communications with any internal networks.

It should be clear that priorities are established in the embodiment of FIG. 3 such that full-route connectivity to the Internet can be quickly established for customers of an ISP. This may be accomplished by assigning priorities based on a number of terminal networks that a network is capable of communicating with. For example, a transit network with full connectivity could be preferred over transit networks with limited connectivity. This can be generalized to include terminal networks by basing priority on a number of connections a network may have. Thus a terminal network with 10,000 customers would be connected before a terminal network with 1000 customers. There are a number of different ways to assign priorities with the goal of establishing full-route connectivity in mind. Although these different methods of assigning priorities are not enumerated herein, they will be clear to one having skill in the art in light of this disclosure.

Figure 4:
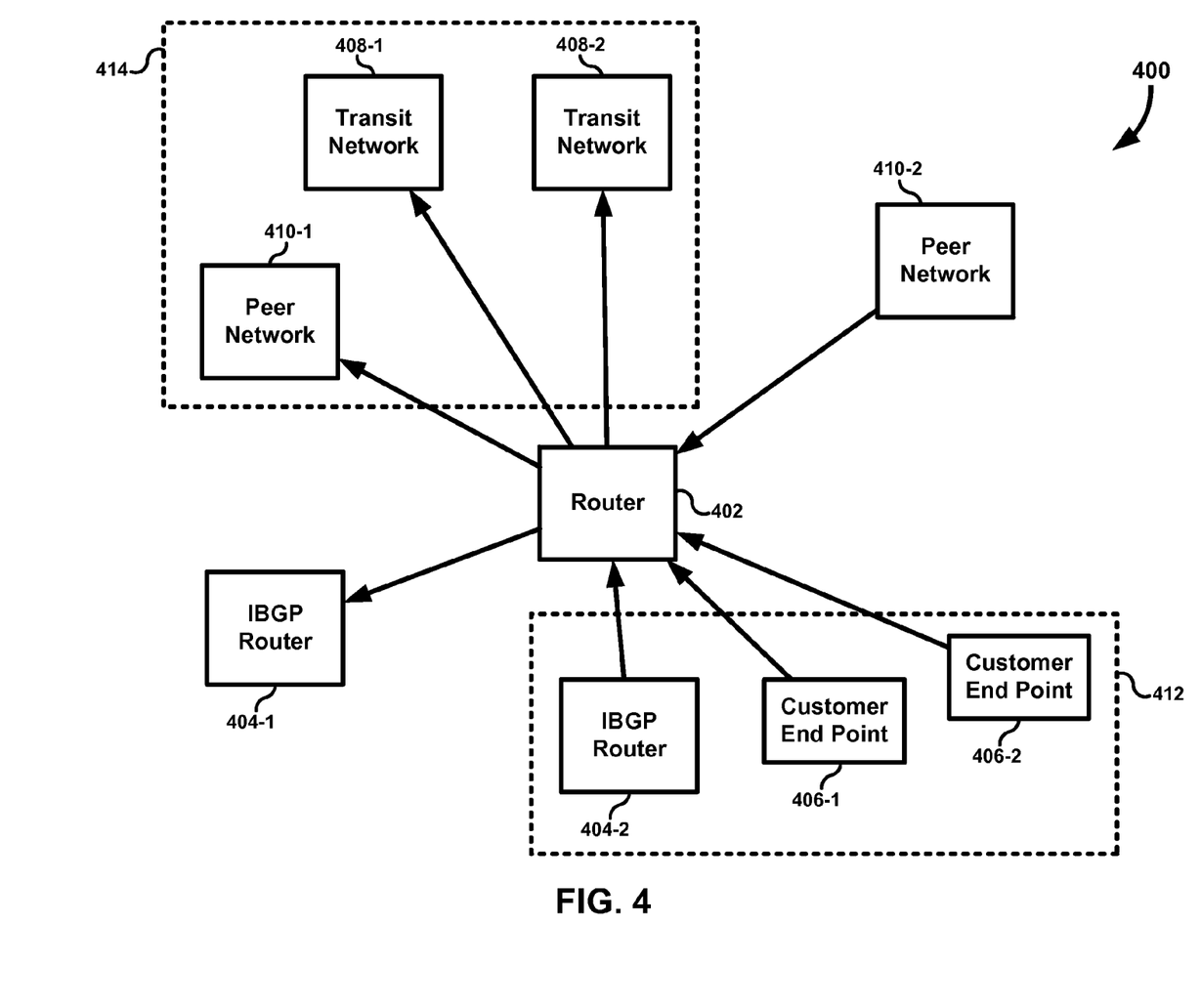
FIG. 4 is a block diagram of another embodiment of an optimal connection network after a power-cycling event.

Referring next to FIG. 4, a block diagram 400 of another embodiment of an optimal connection network after a power-cycling event is shown. In this embodiment, priorities are established based on egress and ingress traffic patterns. This information may be determined by analyzing network traffic flows and may be determined automatically using the application layer of transmissions through a router 402.

In one embodiment, a high-priority may be assigned to external networks that receive a large amount of egress traffic from router 402. Similarly, a high-priority may be assigned to internal networks that provide a large amount of ingress traffic to router 402. The goal could be to determine sources of traffic within the network and correctly route them to the recipients of that traffic in the corresponding external networks.

For example, in FIG. 4 it may be determined by a human operator, or by an automatic process analyzing network traffic flows and/or application layer information, that external networks 414 receive a majority of the egress traffic from router 402. Therefore, peer network 410-1, transit network 408-1, and transit network 408-2 would be assigned a high-priority compared to other external networks. Similarly, internal connections 412 may provide a majority of the ingress traffic to router 402. Therefore, iBGP router 404-2, customer endpoint 406-1, and customer endpoint 406-2 may be assigned a high priority compared to other internal connections. Here, iBGP router 404-2 may be connected to a large number of customer endpoints, and customer endpoints 406-1, 406-2 may represent content servers or user sites that receive a large amount of Internet traffic.

In another embodiment, where priorities are assigned to maximize traffic flow, egress and ingress traffic may be matched between external networks and internal connections. For example, customer endpoint 406-1 may provide a news server that is specific to a geographic location served by peer network 410-1. A large portion of the traffic through router 402 may be comprised of customers of peer network 410-1 accessing the news server provided by customer endpoint 406-1. Therefore, by analyzing network traffic flows and using application layer information, it may be determined that peer network 410-1 and customer endpoint 406-1 should be assigned a common priority. In other words, sources and recipients of information can be matched, and these pairs can be assigned a common priority. This may prevent a large time gap from persisting between the time when a source of information is connected to router 402 and the time when the recipient of that information is subsequently connected to router 402.

Internal systems inside the ISP that are responsible for making routing decisions use key information like BGP routing tables as part of their algorithms. Sharing routes immediately with such an internal system would be beneficial and further decrease the time it takes to deliver content optimally. Thus, embodiments discussed herein can also have the beneficial effect of increasing the speed at which routes can be optimized.

Figure 5:
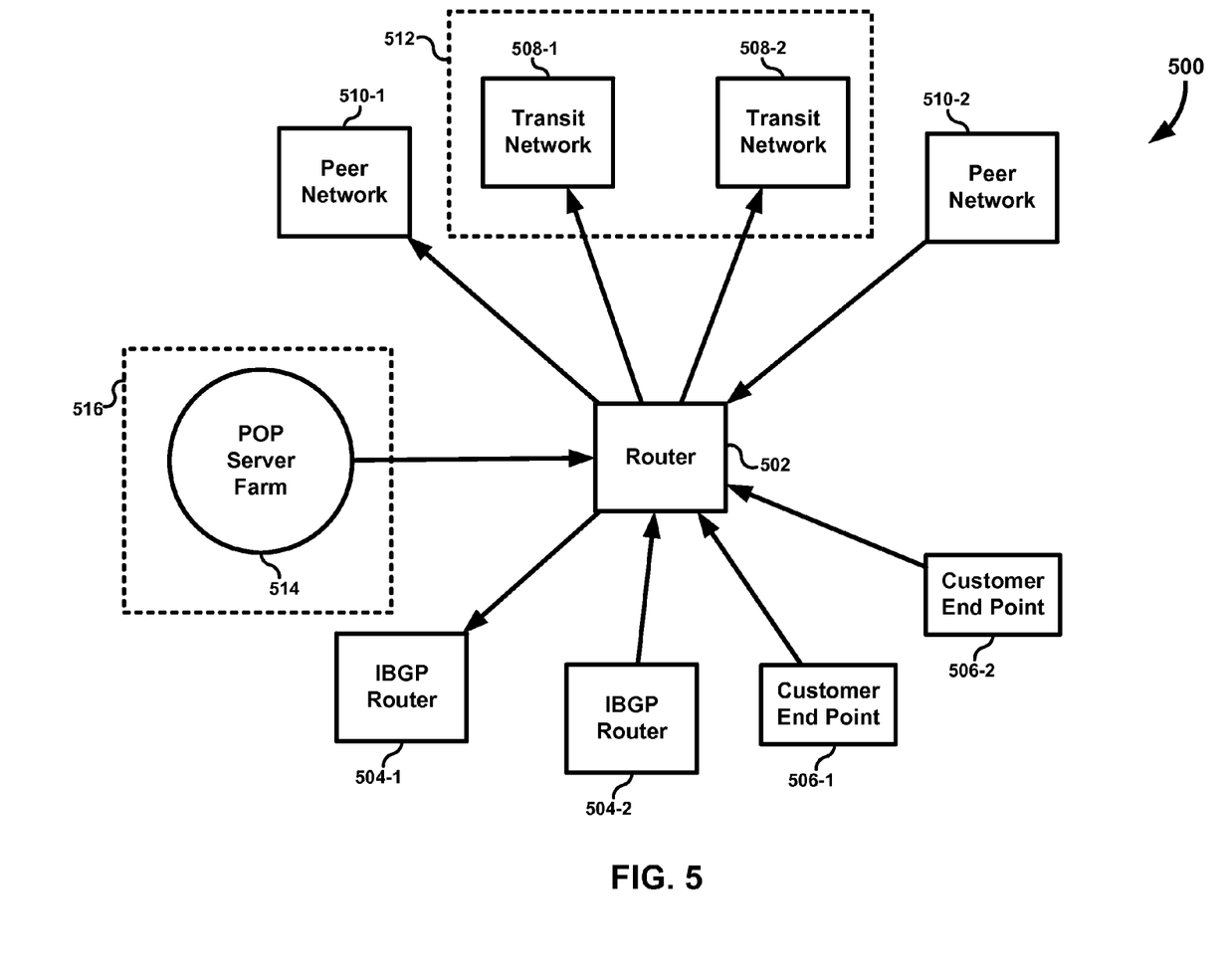
FIG. 5 is a block diagram of another embodiment of an optimal connection network after a power-cycling event.

Referring next to FIG. 5, a block diagram 500 of another embodiment of an optimal connection network after a power cycle is shown. In this embodiment, priorities are assigned based on maximizing revenue for an ISP associated with router 502. To illustrate, a POP server farm 514 is included within the same ISP as router 502. A number of applications and/or media can be hosted within the same POP as router 502, and these applications and/or media typically can generate a significant volume of egress traffic. In turn, that egress traffic can generate revenue for the ISP. Without prioritization during router initialization, a customer endpoint 506 or an iBGP router 504 is likely to establish communications before the transit network 508. However, by adding prioritization, the router 502 can ensure the availability of egress for critical traffic from the POP server farm 514 in order to maximize revenues.

In this embodiment, at least two priority groups can be established. Transit group 512 can be assigned the highest priority so that at least one transit network 508 would first be contacted by router 502. Systems associated with the POP server farm 514 could also be grouped together into a content/application server group 516, and to be assigned the second highest priority. This would ensure that egress traffic from the POP server farm 514 could be transmitted through the transit networks 508 to any destination on the Internet. Afterwards, the iBGP routers 504 could receive the next highest priority in order to fully connect the internal network for the ISP. Finally, any remaining customer endpoints 506 connected to router 502 to receive the next highest priority, or default priority.

In each of the embodiments described in FIGS. 3-5, priorities were assigned to different neighboring networks in order to achieve one or more objectives of the ISP. In one embodiment, the priorities are assigned by a human network operator through an interface to the routers 302, 402, 502. The human network operator could base these priority decisions on analyses of network traffic flows, contractual agreements with neighboring networks, quality of service expectations of ISP customers, and/or the like. For example, the customers of the ISP could choose to pay increased rate in exchange for receiving a higher priority. Also, neighboring networks that receive content from the ISP could form contractual agreements with the ISP to prioritize certain egress routes for content.

In some embodiments, the priorities may be assigned automatically by a computer system or by the processing function within the routers 302, 402, 502. For example, routers 302, 402, 502 could include subroutines analyze network traffic flows an application level data and assign priorities accordingly. As traffic patterns change over time, the subroutine could dynamically update the priorities assigned to each network. In one embodiment, the routers 302, 402, 502 can analyze network congestion and assign higher priorities to transit networks with lower traffic flows. Thus, when a power-cycling event occurs, the router 302, 402, 502 could immediately connect to the transit networks with the most bandwidth in order to establish full-route connectivity for customers of the ISP.

According to standard Internet protocols (TCP/IP), the application layer contains all of the protocols and methods that fall into the realm of process-to-process communications across a network. Application layer methods use the underlying transport layer protocols to establish host-to-host connections, but the application layer data will contain information that relates to the content that is being transmitted by TCP/IP packets. While traditional routers only use lower layers of the TCP/IP protocol, embodiments described herein may examine the application layer data to not only determine traffic flow but to determine the type of information that is embodied in the traffic flow. This information can be used to assign priorities based on cost, connectivity, and matching egress and ingress traffic flows.

In each of the embodiments described in FIGS. 3-5, priorities were assigned to different neighboring networks in order to achieve one or more objectives of the ISP. In other embodiments, these objectives may be combined, or mixed and matched in order to meet the needs of the ISP. In one embodiment, priorities for peer groups can be assigned based on establishing full-route connectivity. However, within each peer group, the priorities can be assigned based on maximizing revenue. In another embodiment, the highest priorities can be assigned to any internal content or application servers and their corresponding egress routes. The remaining priorities could be assigned in order to connect every customer endpoint of the ISP. Any combination of these or other objectives can be made and will be clear in light of this disclosure.

Figure 6:
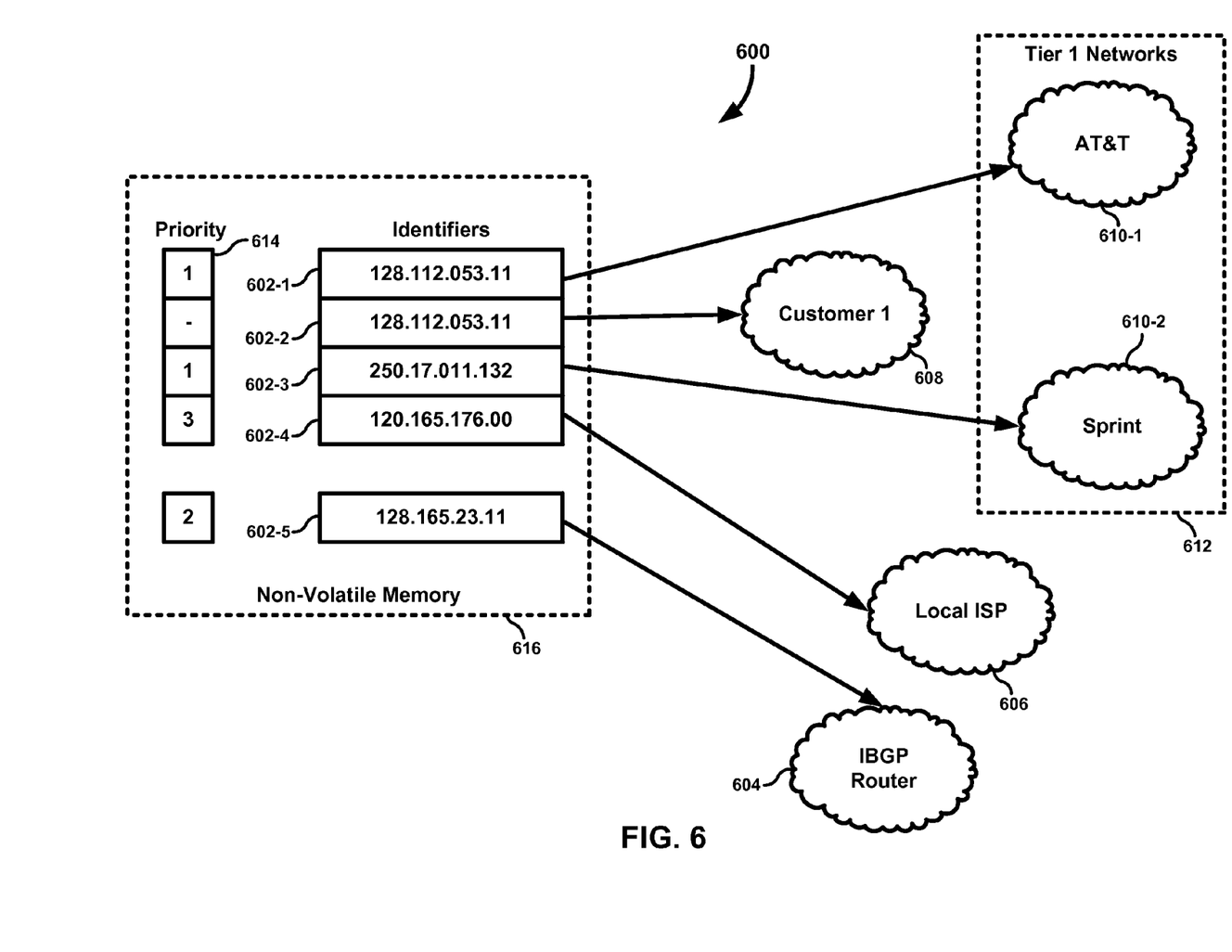
FIG. 6 is a block diagram an embodiment of a memory storing priorities associated with networks.

Referring next to FIG. 6, a block diagram of an embodiment of a memory 616 with priorities associated with networks is shown. In this embodiment, memory 616 can comprise a nonvolatile memory that will continue to reliably store its contents before, during, and after a power-cycling event. Memory 616 can store a plurality of identifiers 602 that have persisted through a power-cycling event. In one embodiment, the plurality of identifiers 602 can comprise a list of IP addresses. The plurality of identifiers 602 can also comprise a list of autonomous system numbers. Each of the plurality identifiers 602 can be associated with one of a plurality of networks 604, 606, 608, 610.

Each of the plurality of identifiers 602 can be associated with one of a plurality of priority fields 614. Each of the plurality of priority fields 614 may include a value representing a priority of at least one of the plurality of networks 604, 606, 608, 610. Each of the plurality of priority fields 614 may also be based on application layer data. More than one of the plurality of priority fields 614 can have the same value. Also, one or more of the plurality of priority fields 614 can remain unassigned, having a null or zero value.

Following a power-cycling event, or when the network connection device initially receives power during an initialization sequence, the processing function may access the memory 616 and can begin attempting to establish communications with one or more of the plurality of networks 604, 606, 608, 610. The processing function may examine the plurality of priority fields 614 and select identifiers associated with the highest priorities first. The processing function can then, using the associated identifiers in the plurality of identifiers 614, begin to access each associated network.

In one embodiment, the order in which the identifiers in the plurality of identifiers 602 are stored within the memory 616 can also be used to determine priority. For example, each of the plurality of priority fields 614 can be used to determine a group priority. Then, in order to prioritize networks within each group, identifiers can be stored in the desired order within the memory 616. In this embodiment, the processing function can examine the plurality of priority fields 614 and then attempt to establish communications with the associated networks according to the order in which the associated identifiers are stored within the memory 616.

In one embodiment (not shown), the plurality identifiers 602 may be stored in a prioritized order without requiring a separate memory location to represent the priority field. In other words, the plurality of identifiers 602 and the plurality of priority fields 614 occupy the same memory location. This memory location can include an IP address, making it an identifier. This memory location can also be stored in a particular order, making it a priority field. Thus, according to this embodiment, the priority field in the identifier can be essentially the same thing.

Figure 7:
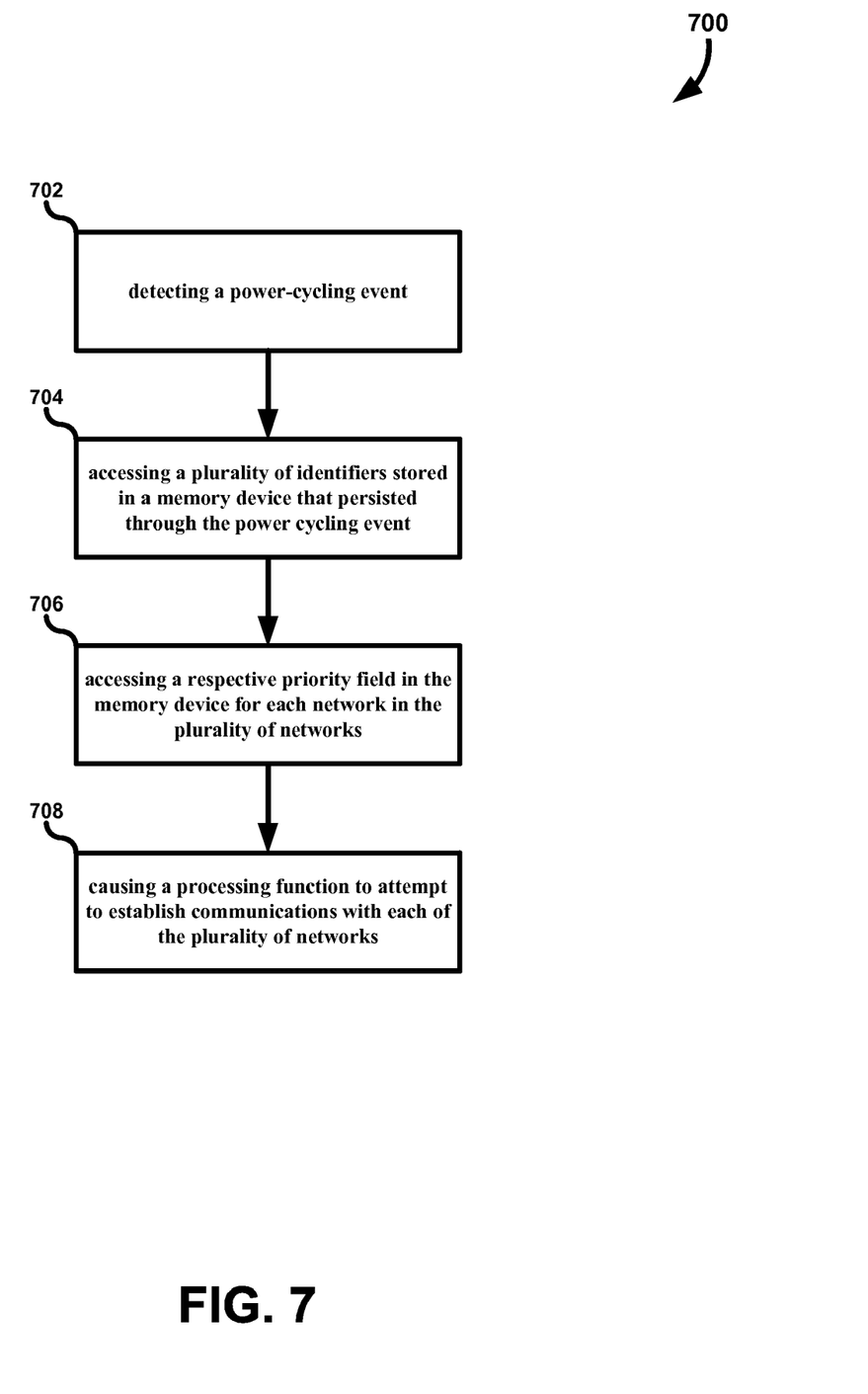
FIG. 7 is a flowchart of an embodiment of a method for establishing routes to neighboring networks during an initialization sequence according to a prioritized order.

Referring next to FIG. 7, a flowchart 700 of an embodiment of a method for establishing routes to neighboring networks during an initialization sequence according to a prioritized order is shown. The method may include detecting a power-cycling event (702). In one embodiment, the power-cycling event comprises a disruption of power. In another embodiment, the power-cycling event comprises turning a device on or applying power to device after the device has been turned off for a prolonged period of time. In yet another embodiment, the power-cycling event comprises a power surge. The power-cycling event may be detected by either a processing function or a power module. In some embodiments, the method may include receiving a signal at the processing function to begin an initialization routine. The signal received by the processing function can occur in response to the power-cycling event, particularly when the power-cycling event comprises a power interruption.

The method may also include accessing a plurality of identifiers stored in a memory device that persisted through the power-cycling event (704). The memory device can comprise a nonvolatile random access memory or any other persistent memory described herein. The plurality of identifiers may have been stored in the memory device prior to the power-cycling event and should have persisted through the power-cycling event. In one embodiment, the plurality of identifiers comprises IP addresses of neighboring networks and may further comprise an autonomous system number. In another embodiment, the plurality of identifiers comprises network prefixes.

Each of the plurality identifiers can be associated with one of the plurality of networks. The plurality of networks may comprise neighboring networks, and the neighboring networks can have a physical connection to the processing function. In one embodiment, the plurality of network comprises at least two types of networks. They can include one or more first networks that are coupled to network endpoints. The first networks may be terminal networks. The plurality of networks can also comprise one or more second networks that are capable of coupling to the one or more first networks. The second networks may be transit networks or full-route networks. In one embodiment, the second networks comprise Tier 1 networks. The one or more first networks can also comprise customers of an ISP.

The method may additionally include accessing a respective priority field in the memory device for each network in the plurality of networks (706). Each respective priority field can be associated with the network. In one embodiment, each respective priority field is based on an order in which communications should be established with the associated network. In another embodiment, each respective priority field can be based on application layer information. In a particular embodiment, each priority field is based on a number of second networks with which the associated network is capable of coupling. In another embodiment, each priority field is based on maximizing revenues. In another embodiment, each priority field is based on information from one or more BGP policy files. In yet another embodiment, each priority field is based on optimizing egress and ingress routes in the plurality of networks. In yet another embodiment, each priority field is based on quickly establishing full-route connectivity to the Internet for customers of an ISP.

In one embodiment, the plurality of networks may be divided into two priority groups. The method may further include accessing a first priority value assigned to the priority field of each of the one or more first networks and accessing a second priority value assigned to the priority field of each of the one or more second networks. In other words, full-route networks may be assigned a first priority value, and terminal networks may be assigned a second priority value. The plurality of networks may also be divided into peer groups, and uniform priority values may be assigned to each network within a peer group.

The method may further include causing a processing function to attempt to establish communications with each of the plurality of networks (708). In one embodiment, the attempts to establish communications are ordered based on the respective priority field associated with each of the plurality of networks.

Figure 8:
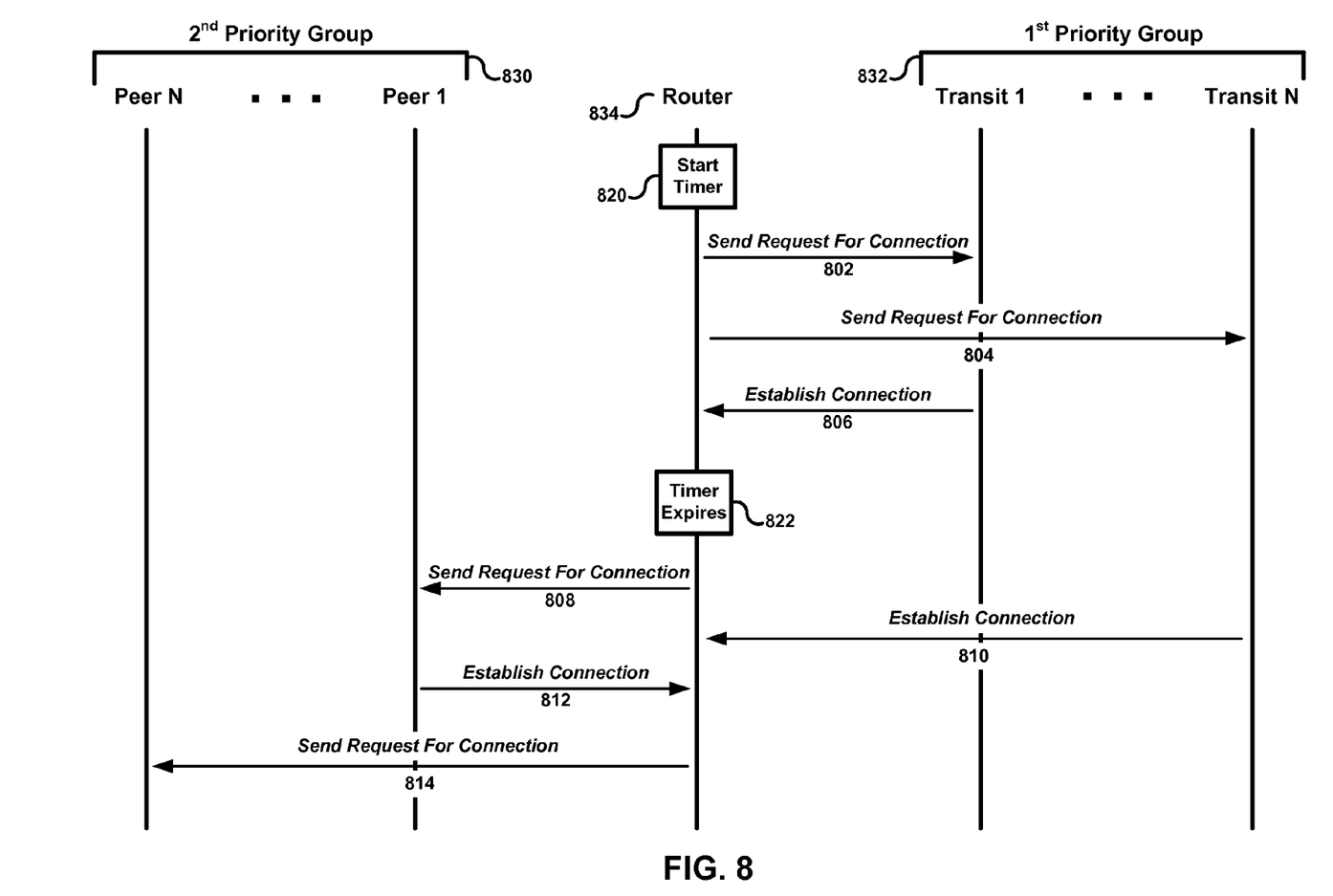
FIG. 8 is a sequence diagram of transactions between networks, according to one embodiment.

Referring next to FIG. 8, a sequence diagram of transactions between networks is shown, according to one embodiment. The transactions in FIG. 8 illustrate how a device might deal with the asynchronous nature of establishing communications with neighboring networks. As stated earlier, establishing communications and advertising routes between two networks may be comprised of a number of back-and-forth communications. For example, in some implementations, BGP peer establishment begins with the creation of a TCP/IP connection between two devices, one belonging to each network. After the TCP/IP connection is established, the BGP devices attempt to create a BGP session by exchanging BGP "Open" messages where they exchange BGP version, AS number, hold time, and/or a BGP identifier. Each of these communications may be comprised of the request, followed by a response or acknowledgment. The time between the request and the acknowledgment can be seconds or minutes. The acknowledgment may not come at all if there was a problem with the request or if the receiving network is unavailable.

In one embodiment, timers may be used to determine when a router should move from one priority group to the next. FIG. 8 shows router 834 connected to at least two groups of networks, where each group is assigned a priority. The first priority group 832 comprises transit networks 1-N, and the second priority group 830 comprises peer networks 1-N. The initialization routine after a power-cycling event may comprise starting a timer (820). The router 834 can send a request for a connection to the first transit network in the first priority group 832 (802). The request for the connection may be comprised of an open request for a TCP/IP connection. At this point, router 834 can wait for the first transit network to respond before moving on.

In one embodiment, router 834 sends a request for a connection to the second transit network in the first priority group 832 before receiving a response from the first transit network (804). At some point, the first transit network in the first priority group 832 may respond or acknowledge the request by establishing a connection to the router 834 (806). Note the asynchronous nature of this response and note that it could very well have come prior to any request being sent to the second transit network. Having established a connection with the first transit network, router 834 can continue attempting to establish communications with other transit networks in the first priority group 832. In an alternative embodiment, after establishing a single connection with a transit network, router 832 could move on to other priority groups. Although this description refers to "establishing communications," this can mean either establishing a TCP/IP connection, or it can mean sending and receiving route information, depending on the embodiment.

In the embodiment shown in FIG. 8, the timer expires prior to receiving a response from the second transit network in the first priority group 832 (822). The expiration of the timer may operate as a trigger indicating to the router 834 that it should move on to the second priority group 830. At this point, the router 834 can send a request for a connection to a first peer network in the second priority group 830 (808).

Even though the router 834 has moved from one priority group to the next, pending communication sessions from a previous priority group may still be addressed. For example, after sending the request of the first peer network in the second priority group 830, the router 834 can receive a response from the second transit network in the first priority group 832 (810). In one embodiment, the router 834 can disregard further communications from the first priority group 832 in order to focus its resources on the second priority group 830. In a different embodiment, the router 834 can continue to communicate with networks in the first priority group 832 while communicating with networks in the second priority group 830.

In this example, the first peer group in the second priority group 830 is able to respond almost immediately after the response is received from the second transit network in the first priority group 832, and a connection is established between the first peer network and the router 834 (812). Therefore, the router 834 may completely establish communications and exchange routing information with one network before moving on to the next network. This may be determined by how quickly subsequent networks in the priority list respond to subsequent requests. In this example, the router 834 moves on by sending a request for a connection to a second peer network in the second priority group 830 (814).

Although the sequence diagram in FIG. 8 illustrates only two priority groups and a single timer operation, it will be understood that multiple timers may be used simultaneously to coordinate communication attempts with multiple priority groups. For example, each priority group may be assigned its own timer. Each network may be assigned its own timer, and the timers may be used to timeout networks that do not respond. Timer periods for different priority groups and/or networks may overlap, such that communications may attempt to be established with networks from both priority groups during an overlapping time interval. Many different configurations are possible in light of this disclosure.

Figure 9:
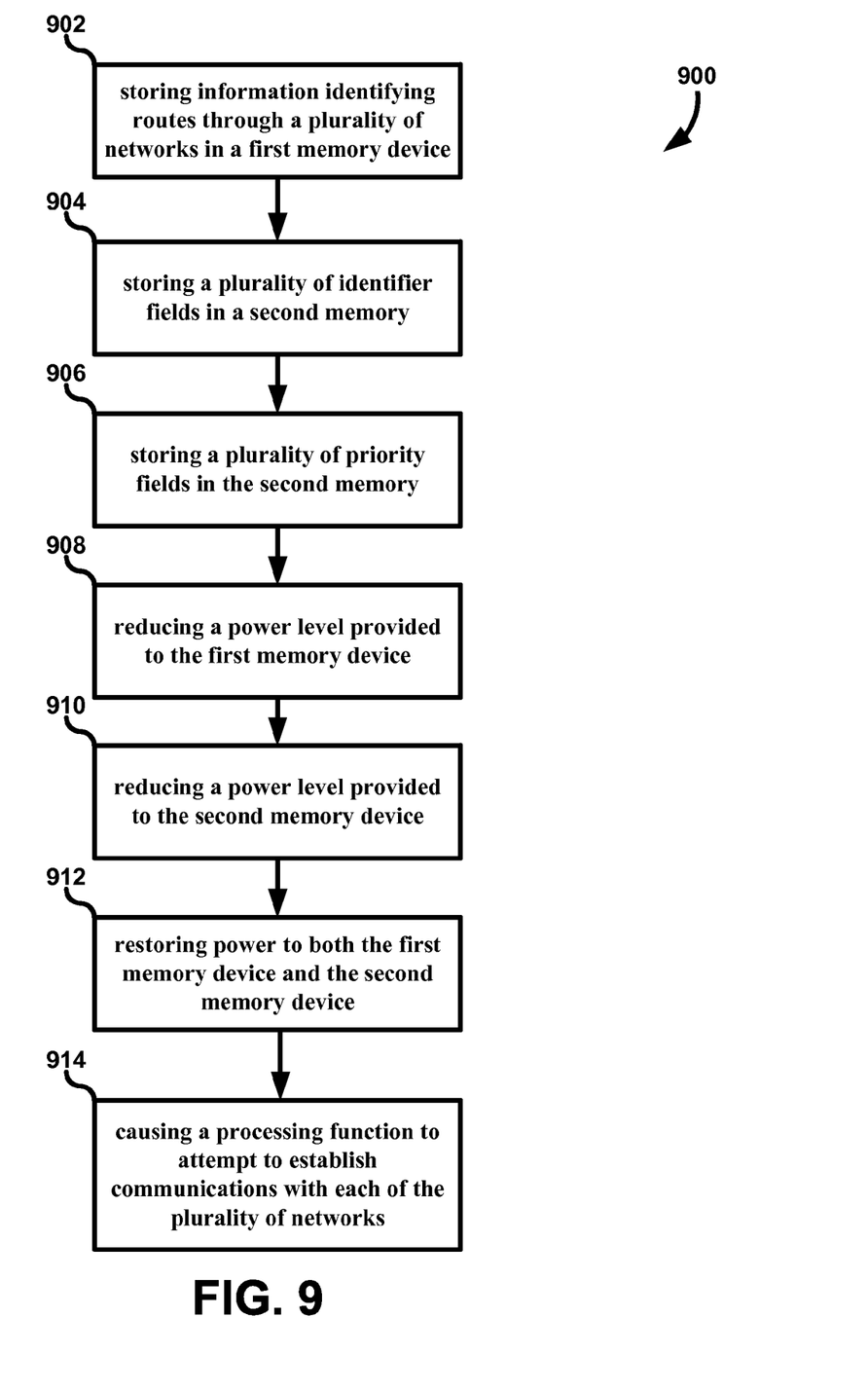
FIG. 9 is a flowchart of an embodiment of a method for establishing routes to neighboring networks using persistent and non-persistent memory devices.

Referring next to FIG. 9, a flowchart of an embodiment of a method for establishing routes to neighboring networks using persistent and non-persistent memory devices is shown. This method may span the time before, during, and after a power-cycling event. The method may include storing information identifying routes through a plurality of networks in a first memory device (902). In one embodiment, the information identifying routes may comprise an Internet routing table that was previously constructed by advertising and receiving route information to and from neighboring networks and optimizing those routes according to policies. The first memory device may comprise a volatile memory such as an NVRAM.

The method may also include storing a plurality of identifier fields in a second memory (904). The identifier fields may comprise IP addresses, autonomous system numbers, network addresses, prefixes, and/or the like. The second memory may comprise a nonvolatile memory, including any persistent memory described in relation to FIG. 2. The method may additionally include storing a plurality of priority fields in the second memory (906). The priority fields may be comprised of a single bit dividing networks into one of two priority categories. In another embodiment, the priority fields may be a byte value with a number representing a priority. In another embodiment, the priority fields may each be comprised of multiple values, corresponding to one or more groups of networks and priorities within each group. In yet another embodiment, storing the priority fields may be comprised of using the existing identifier fields as priority fields and storing them in a prioritized order.

The method may further include reducing a power level provided to the first memory device (908). In one embodiment the power level may be reduced such that the information identifying routes is no longer accessible in the first memory device. Power may be reduced as a part of a power-cycling event and may be due to a network power outage. The method may also include reducing a power level provided to the second memory device (910). The power may be reduced at the same time and in the same way as power was reduced for the first memory device. This may be the case when both memory devices are supplied power by the same power module. In another embodiment, the power may be reduced to less than 1 W. When power is reduced to the second memory, the plurality of identifier fields and the plurality of priority fields remain accessible in the second memory device.

Many router power systems are designed to accept small variances in voltage per circuit. A number of circuits may be installed that provide redundant power to a chassis. Power-down is based on a variable of how many circuits of power are installed and how many slots in the chassis are occupied and drawing power. If the number of slots needing power exceeds the amount of circuits operating within normal voltages then the router will power itself off and immediately lose all BGP-learned forwarding information. For example, there could be 4000 watts of power being supplied to the chassis, but if it needs 8000 watts to run it will remain in a non-initialized state. Therefore, the detecting a "power-down" state may vary depending on the particular hardware and chassis arrangement.

The method may additionally include restoring power to both the first memory device and the second memory device (912). As with reducing the power, restoring the power to both the first memory device and the second memory device may occur at the same time. Alternatively, one memory may be powered before the other memory is part of an initialization sequence. As discussed above, restoring power may include signals being sent or detected to the processing function that an initialization sequence should be executed.

The method may further include causing a processing function to attempt to establish communications with each of the plurality of networks (914). The attempts to establish communications are ordered based on the respective priority field associated with each of the plurality of networks. The attempts to establish communications can be ordered according to any of the techniques discussed herein above, and the priorities may be used in any of the ways discussed herein.

While the principles of the disclosure have been described above in connection with specific apparatuses and methods, it is to be clearly understood that this description is made only by way of example and not as limitation on the scope of the invention.

What is claimed is:

1. A method for establishing routes to neighboring networks during an initialization sequence according to a prioritized order, the method comprising:
    detecting a power-cycling event;
    accessing a plurality of identifiers stored in a memory device that persisted through the power-cycling event, wherein:
        each of the plurality of identifiers is associated with one of a plurality of networks;
        the plurality of networks comprises:
            one or more first networks that are coupled to network endpoints; and
            one or more second networks that are capable of coupling to the one or more first networks;
    for each network in the plurality of networks, accessing a respective priority field in the memory device, wherein:
        the respective priority field is associated with the network, and
        the respective priority field is based on:
            an order in which communications should be established with the network, and
            application layer information network traffic occurring prior to the most recent power-cycling event;
    causing a processing function to attempt to establish communications with each of the plurality of networks, wherein the attempts to establish communications each comprises an initial attempt, and wherein the initial attempts are ordered based on the respective priority field associated with each of the plurality of networks.

2. The method of claim 1 for establishing routes to neighboring networks during an initialization sequence according to a prioritized order, wherein the priority field associated with each of the plurality of networks is based on a number of second networks with which the network is capable of coupling.

3. The method of claim 1 for establishing routes to neighboring networks during an initialization sequence according to a prioritized order, wherein the priority field associated with each of the plurality of networks is based on maximizing revenues.

4. The method of claim 1 for establishing routes to neighboring networks during an initialization sequence according to a prioritized order, wherein the priority field associated with each of the plurality of networks is based on information from one or more BGP policy files.

5. The method of claim 1 for establishing routes to neighboring networks during an initialization sequence according to a prioritized order, wherein the priority field associated with each of the plurality of networks is based on optimizing egress and ingress routes in the plurality of networks.

6. The method of claim 1 for establishing routes to neighboring networks during an initialization sequence according to a prioritized order, further comprising:

accessing a first priority value assigned to the priority field of each of the one or more first networks; and accessing a second priority value assigned to the priority field of each of the one or more second networks.

7. The method of claim 1 for establishing routes to neighboring networks during an initialization sequence according to a prioritized order, wherein the one or more second networks comprise Tier 1 networks.

8. The method of claim 1 for establishing routes to neighboring networks during an initialization sequence according to a prioritized order, further comprising, prior to causing the one or more processing functions to attempt to establish communications with each of the plurality of networks, receiving a signal at the processing function to begin an initialization routine.

9. The method of claim 8 for establishing routes to neighboring networks during an initialization sequence according to a prioritized order, wherein receiving the signal at the processing function to begin the initialization routine occurs in response to a power interruption.

10. The method of claim 1 for establishing routes to neighboring networks during an initialization sequence according to a prioritized order, wherein each of the plurality of identifiers comprises a network address.

11. The method of claim 1 for establishing routes to neighboring networks during an initialization sequence according to a prioritized order, wherein the memory device comprises a nonvolatile random access memory.

12. A device for determining routing pathways for transmitting information over a network, the device comprising:
    a network interface, wherein:
        the network interface is coupled to a plurality of networks;
        the plurality of networks comprises:
            one or more first networks that are coupled to network endpoints; and
            one or more second networks that are capable of coupling to the one or more first networks;
    a power module that participates in a power-cycling event;
    a persistent memory device storing:
        a plurality of identifier fields, wherein each of the plurality of identifier fields is associated with one of a plurality of networks; and
        a plurality of priority fields, wherein:
            each of the plurality of priority fields is associated with at least one of the plurality of networks; and
            each of the plurality of priority fields is based on:
                an order in which communications should be established with the respective network, and
                application layer information network traffic occurring prior to the most recent power-cycling event;
    a processing function that receives an indication from the power module of the power-cycling event has occurred and attempts to establish communications each comprises an initial attempt, and wherein the initial attempts with each of the plurality of networks, wherein the attempts to establish communications are ordered based on the respective priority field associated with each of the plurality of networks.

13. The device of claim 12 for determining routing pathways for transmitting information over a network, further comprising a timer function, wherein:

the timer function starts timing when the processing function begins attempting to establish communications with each of the one or more second networks; and the timer function determines when a predetermined time period has expired;

the timer function sends a signal to the processing function to begin attempting to establish communications with each of the one or more first networks.

14. The device of claim 12 for determining routing pathways for transmitting information over a network, wherein the plurality of networks is divided into one or more priority groups, wherein the priority fields associated each network in a priority group store a common value.

15. The device of claim 12 for determining routing pathways for transmitting information over a network, wherein the plurality of networks is divided into one or more peer groups based on application layer data, and a single value stored in a priority field is associated with each peer group.

16. The device of claim 12 for determining routing pathways for transmitting information over a network, wherein the one or more first networks comprises customers of an entity associated with the device.

17. The device of claim 12 for determining routing pathways for transmitting information over a network, wherein the network interface is further coupled to a POP server farm.

18. A method for prioritizing establishing routes to neighboring networks using persistent and non-persistent memory devices, the method comprising:
    storing information identifying routes through a plurality of networks in a first memory device;
    storing a plurality of identifier fields in a second memory device, wherein the each of identifier fields are associated with one of the plurality of networks;
    storing a plurality of priority fields in the second memory device, wherein each of the priority fields are associated with one of the plurality of networks;
    reducing a power level provided to the first memory device such that the information identifying routes is no longer accessible in the first memory device;
    reducing a power level provided to the second memory device, wherein the plurality of identifier fields and the plurality of priority fields remains accessible in the second memory device;
    restoring power to both the first memory device and the second memory device;
    causing a processing function to attempt to establish communications with each of the plurality of networks, wherein the attempts to establish communications each comprises an initial attempt, and wherein the initial attempts are ordered based on the respective priority field associated with each of the plurality of networks, wherein the prioritizing establishing routes to neighboring networks uses persistent and non-persistent memory devices, and wherein the priority fields in the second memory device are determined automatically based on application level data and network traffic occurring prior to the power levels being reduced.

19. The method of claim 18 for prioritizing establishing routes to neighboring networks during using persistent and non-persistent memory devices, wherein reducing the power level provided to the first memory and reducing the power level provided to the second memory comprises reducing the power levels to less than 1 W.

* * * * *